United States Patent
Fuchs et al.

(10) Patent No.: US 7,872,678 B2
(45) Date of Patent: Jan. 18, 2011

(54) METHOD FOR CHECKING FUNCTIONAL RELIABILITY OF AN IMAGE SENSOR HAVING A PLURALITY OF PIXELS

(75) Inventors: Oliver Fuchs, Esslingen (DE); Dieter Bittner, Deggingen (DE); Martin Wendler, Stuttgart (DE); Dietmar Doettling, Leinfelden-Echterdingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 1665 days.

(21) Appl. No.: 10/909,714

(22) Filed: Jul. 30, 2004

(65) Prior Publication Data

US 2005/0036045 A1 Feb. 17, 2005

Related U.S. Application Data

(63) Continuation of application No. PCT/EP03/00637, filed on Jan. 23, 2003.

(30) Foreign Application Priority Data

Feb. 4, 2002 (DE) ................. 102 05 691

(51) Int. Cl.
  *H04N 9/64* (2006.01)
  *H04N 5/202* (2006.01)
  *H04N 5/228* (2006.01)
  *H04N 7/18* (2006.01)

(52) U.S. Cl. .............. 348/246; 348/247; 348/243; 348/244; 348/254; 348/222.1; 348/143

(58) Field of Classification Search ......... 348/241–247, 348/254, 82, 143; 382/270–274, 143, 103–106
See application file for complete search history.

(56) References Cited

U.S. PATENT DOCUMENTS 528,123 A 10/1894 Devereux (Continued)

FOREIGN PATENT DOCUMENTS

DE 36 32 488 C2 4/1987

(Continued)

OTHER PUBLICATIONS

Bosco, A., "Fast method for noise level estimation and integrated noise reduction," Aug. 2005, IEEE Transactions on Consumer Electronics, vol. 51, pp. 1028-1033.*

(Continued)

*Primary Examiner*—Jason Chan
*Assistant Examiner*—Michael Osinski
(74) *Attorney, Agent, or Firm*—Harness, Dickey & Pierce, P.L.C.

(57) ABSTRACT

A method for checking the functional reliability of an image sensor evaluates statistical fluctuations in the grey-scale values provided by the pixels of the image sensor. An actual noise factor, which is derived for light impinging on the pixels, is evaluated. A pixel failure is assumed if the actual noise factor misses a predetermined criterion defined by a reference noise factor. According to one embodiment, the reference noise factor is a dark noise factor. An electronic camera that operates in accordance with the above-described method is also disclosed.

31 Claims, 4 Drawing Sheets

U.S. PATENT DOCUMENTS

| | | | |
|---|---|---|---|
| 779,861 A | 1/1905 | Maringer | |
| 4,602,291 A | 7/1986 | Temes | |
| 4,654,714 A * | 3/1987 | Hurst et al. | 348/247 |
| 5,047,861 A * | 9/1991 | Houchin et al. | 348/247 |
| 5,047,863 A * | 9/1991 | Pape et al. | 348/247 |
| 5,144,446 A * | 9/1992 | Sudo et al. | 348/246 |
| 5,272,536 A * | 12/1993 | Sudo et al. | 348/243 |
| 5,416,516 A * | 5/1995 | Kameyama et al. | 348/246 |
| 5,796,430 A * | 8/1998 | Katoh et al. | 348/246 |
| 6,091,492 A | 7/2000 | Strickland et al. | |
| 6,181,830 B1 * | 1/2001 | Sato | 382/274 |
| 6,307,393 B1 * | 10/2001 | Shimura | 324/765 |
| 6,593,961 B1 * | 7/2003 | Perino | 348/187 |
| 6,618,084 B1 * | 9/2003 | Rambaldi et al. | 348/247 |
| 6,683,643 B1 * | 1/2004 | Takayama et al. | 348/247 |
| 6,737,625 B2 * | 5/2004 | Baharav et al. | 250/208.1 |
| 6,965,410 B1 * | 11/2005 | Yamagishi | 348/362 |
| 7,106,371 B1 * | 9/2006 | Kubo et al. | 348/246 |
| 7,133,072 B2 * | 11/2006 | Harada | 348/243 |
| 7,301,673 B2 * | 11/2007 | Kang | 358/3.03 |
| 7,324,143 B1 * | 1/2008 | Pelz | 348/241 |
| 2002/0015111 A1 * | 2/2002 | Harada | 348/642 |
| 2002/0080253 A1 * | 6/2002 | Kim | 348/246 |
| 2002/0176013 A1 * | 11/2002 | Itoh | 348/243 |
| 2002/0196354 A1 * | 12/2002 | Chang et al. | 348/246 |
| 2003/0030723 A1 * | 2/2003 | Dottling et al. | 348/82 |
| 2003/0128285 A1 * | 7/2003 | Itoh | 348/246 |
| 2003/0133027 A1 * | 7/2003 | Itoh | 348/246 |
| 2003/0179418 A1 * | 9/2003 | Wengender et al. | 358/437 |
| 2004/0239782 A1 * | 12/2004 | Equitz et al. | 348/246 |
| 2008/0143855 A1 * | 6/2008 | Hussey et al. | 348/241 |

FOREIGN PATENT DOCUMENTS

| | | | |
|---|---|---|---|
| DE | 40 20 017 A1 | | 1/1992 |
| DE | 691 05 815 T2 | | 4/1995 |
| DE | 195 27 148 C1 | | 1/1997 |
| DE | 100 17 333 A1 | | 10/2001 |
| EP | 0 179 252 | | 4/1986 |
| EP | 0 458 030 A1 | | 11/1991 |
| EP | 0 902 402 A2 | | 3/1999 |
| EP | 0 998 138 A2 | | 5/2000 |
| GB | 2421654 | * | 11/2005 |
| JP | 63248289 | | 10/1988 |
| JP | 2000209506 | | 7/2000 |

OTHER PUBLICATIONS

Chapman, G.H., "On-line identification of faults in fault-tolerant imagers," Oct. 3-5, 2005, Defect and Fault Tolerance in VLSI Systems, 2005, pp. 149-157.*

Jung, C., "Noise analysis of fault tolerant active pixel sensors," Oct. 3-5, 2005, Defect and Fault Tolerance in VLSI Systems, 2005, pp. 140-148.*

* cited by examiner

METHOD FOR CHECKING FUNCTIONAL RELIABILITY OF AN IMAGE SENSOR HAVING A PLURALITY OF PIXELS

CROSS-REFERENCES TO RELATED APPLICATIONS

This application is a continuation of copending international patent application PCT/EP03/00637 which was filed on Jan. 23, 2003 designating the U.S., which is published in German language, and which claims priority from German patent application DE 102 05 691.9, filed on Feb. 4, 2002.

BACKGROUND OF THE INVENTION

The present invention relates to a method for checking the functional reliability of an image sensor having a plurality of light-sensitive pixels, wherein grey-scale values of at least one light-sensitive pixel are evaluated.

The invention furthermore relates to an apparatus, and in particular to an electronic camera, having an image sensor, which has a plurality of light-sensitive pixels, and further having an output unit, which provides grey-scale values from the light-sensitive pixels for read-out.

The invention is particularly related to a method and an electronic camera for use in a protective apparatus for safeguarding a hazardous area, such as the working area of an automated machine.

DE 100 17 333 A1 describes a protective apparatus for safeguarding a hazardous area and also a method for checking the functional reliability of the protective apparatus. The protective apparatus comprises an electronic camera which, by way of example, can record the hazardous area of a machine operating in an automated manner. The recorded image is evaluated by electronic image processing means in order to check whether, by way of example, a person is situated in the hazardous area. If appropriate, the machine is shut down.

In order to achieve the safeguarding desired with such a protective apparatus, it is necessary to ensure the functional reliability of the protective apparatus itself. For this reason, it is necessary to regularly check the functional reliability of the camera used in the protective apparatus.

In accordance with DE 100 17 333 A1, the image recorded by the camera is modified for the purpose of checking the functional reliability of the image sensor. The modified object image is then compared with a reference image comprising the expected modifications. If the modified image deviates from the reference image, a functional error of the image sensor is assumed. This method makes it possible to realize a protective apparatus which, inter alia, meets the high safety requirements of categories 3 and 4 of European Standard EN 954-1. In particular, it is possible to achieve an uninterrupted (in time) monitoring of the hazardous area and a checking of individual pixels. However, modification of the image requires mechanical and/or optical components which influence the beam path of the incident light. This makes the known protective apparatus relatively expensive.

EP 0 902 402 A2 discloses a method and an apparatus for optically monitoring a spatial area. In order to check the functional reliability of this apparatus, a camera is dazzled with a light-emitting diode. The image pattern then recorded by the camera is compared with a stored reference pattern. However, this method has the disadvantage that the camera is "blind" while the functional test is being carried out, which makes it impossible to effect uninterrupted monitoring. Moreover, this method cannot reliably check whether individual pixels or areas of the image sensor are defective.

EP 0 179 252 A2 discloses a protective apparatus having a camera which is based on the optical evaluation of colour differences. An operator who is to be protected wears clothing of different coloration from the hazardous machine. In order to check the functional reliability of the camera used for the monitoring, the presence of a colour pattern is continuously checked. However, these methods either do not allow to check, in a defined manner, individual pixels or areas of the image sensor used in the camera.

SUMMARY OF THE INVENTION

In view of the above, it is an object of the present invention to provide an alternative method for checking the functional reliability of an image sensor.

It is another object of the invention to provide a method for checking the functional reliability of an image sensor which allows uninterrupted monitoring of an area while the functional reliability of the image sensor is checked.

It is yet another object to provide a method for checking the functional reliability of an image sensor which avoids the use of expensive mechanical and/or optical components in the beam path of the image sensor for producing modifications in the recorded image.

It is yet another object to provide a method which allows to check the functional reliability of an image sensor in a cost efficient and reliable manner.

It is yet another object to provide an electronic camera having an image sensor and having a monitoring unit for checking the functional reliability of the image sensor without interrupting the recording of images.

According to one aspect of the invention, there is provided a method of the type mentioned at the outset and comprising the following steps: determining a present noise factor of the grey-scale values of the at least one pixel, providing a reference noise factor for the at least one pixel, and evaluating the present noise factor and the reference noise factor, wherein a functional error is assumed if the present noise factor misses a predetermined criterion with regard to the reference noise factor.

According to another aspect, there is provided an electronic camera having a memory in which at least one reference noise factor for at least one pixel is stored, and wherein a monitoring unit has a noise determining part and a comparator, the noise determining part being capable of determining a present noise factor of grey-scale values of at least one pixel, the comparator being capable of comparing the present noise factor and the reference noise factor, and a functional error being assumed if the present noise factor misses a predetermined criterion with regard to the reference noise factor.

According to the invention, it has been recognized that a defective pixel of an image sensor has a specific noise behavior that deviates from that of a functional pixel. In this connection, the term noise relates to statistical fluctuations of the grey-scale values of the individual pixels, which occur even in the case of constant ambient conditions. These statistical fluctuations are attributable to various causes, inter alia to photon noise, to dark noise and to fixed pattern noise. Photon noise is based on the quantum-physical property of light. Signal fluctuations clearly result in this case because a different number of "light particles" impinge on the pixels at different points in time. Photon noise increases as the intensity of the incident light increases. At high light intensities, the photon noise predominates and the total noise level is then approximately proportional to the root of the light intensity.

Dark noise describes statistical processes during the conversion of the electromagnetic energy incident on the image sensor into electrical signals. Dark noise is caused inter alia by inhomogeneities during charge carrier transport. Furthermore, electronic components that are integrated into the image sensor or linked thereto contribute to the noise level. Dark noise has the characteristic of being independent of the light intensity. However, dark noise is dependent on the ambient temperature.

Fixed pattern noise results from inhomogeneities of the individual pixels of an image sensor. This is primarily caused by manufacturing tolerances. Fixed pattern noise has no influence on the noise behavior of an individual pixel; it is manifested only upon comparison with other pixels.

The proposed methods use a present or actual noise factor to compare the present noise behavior of the pixel to be checked with an expected behavior defined by a reference noise factor. Preferably, the reference noise factor reflects the noise behavior of an intact pixel. The comparison takes place on the basis of a predetermined criterion which may be dependent on the noise factors defined in the individual case, for example a magnitude comparison or an identity comparison. If the present noise factor for the checked pixel reveals a different noise behavior from that characterized by the reference noise factor, a functional error is assumed.

The new approach does not require mechanical or optical components beyond those which are typically required for image recording. It does especially not require mechanical or optical components which act to modify the recorded image for checking the functional reliability of the image sensor. The approach can be implemented solely on the basis of the grey-scale values that are present anyway. Accordingly, an apparatus according to the invention can be realized in a highly cost-effective manner, in particular in the case of large numbers. What is more, the new approach enables an uninterrupted monitoring since the checking of the functional reliability does not require external test signals. Consequently, the image sensor does not become "blind".

In a refinement of the invention, the present noise factor is determined in such a way that it varies in a manner dependent on a light intensity, and the reference noise factor is a dark noise factor.

In this refinement, the present noise factor primarily reflects the intensity of the photon noise. The dark noise factor specifies the noise level of the pixel in darkness. Since the photon noise leads to a light-dependent rise in noise, it is possible, by comparing the magnitudes of these two noise factors, to ascertain particularly simply whether a pixel has the desired sensitivity to incident light. A functional error is assumed if the present noise factor does not exceed the dark noise factor despite a background brightness that is present. Since the light impinges on the image sensor "from outside", the entire signal processing chain which a recorded image signal also passes through is checked in a single step in this case. This refinement therefore enables an efficient and complete checking of the entire image recording path.

In another refinement, the present noise factor is determined by a statistical evaluation of a plurality of successively read-out grey-scale values.

As an alternative, a measurement-based determination of noise levels is also possible, in principle. However, the determination of the present noise factor that is preferred here can be realized very simply and cost-effectively since a camera often already has a microprocessor or microcontroller which can be used to carry out a statistical evaluation of data. The apparatus according to the invention therefore manages without additional measuring means. In particular, the variance of the grey-scale values of a pixel, the mean deviation of a present grey-scale value from the preceding grey-scale value or the difference between the extrema of all the grey-scale values of a pixel within a measurement cycle may serve as the present noise factor.

In a further refinement, the present noise factor and the reference noise factor are determined in a respectively identical manner.

This enables a particularly simple comparison of the two quantities. Accordingly, the realization outlay is low, and the comparison can be carried out very rapidly.

In a further refinement, the present noise factor and the reference noise factor are compared with one another in a manner dependent on a present ambient temperature range.

This enables an improvement of the accuracy and reliability since it is possible to take account of and correct alterations owing to the temperature dependence of the dark noise.

In a further refinement, the present noise factor for the at least one pixel is determined as an absolute value.

Accordingly, the present noise factor for each pixel is determined in an isolated manner, i.e. independently of other pixels. As an alternative to this, it is also possible, in principle, to determine the noise factor relative to the noise level of one or more other pixels. The preferred refinement makes it easier to expose so-called "stuck at" errors, in the case of which the grey-scale values of a pixel "stick" at a constant value independently of the light incidence. The variance or the average deviation of a present grey-scale value from its predecessor value is preferably used here as the absolute value.

In a further refinement, the present noise factor and the reference noise factor are compared to one another with regard to respectively identical pixels.

This enables a defined detection of "stuck at" errors in individual pixels in a simple manner.

In a further refinement, the present noise factor is determined from a ratio of the grey-scale values of at least two different pixels.

In this case, the noise factor used reflects the characteristic behavior of at least two separate pixels. This enables a simple detection of cross-correlations. By way of example, the mean value of the difference in magnitude between contemporaneous grey-scale values of the two pixels may be used here as the noise factor. If this noise factor is less than or equal to the dark noise despite a background brightness that is present, the pixels are not independent of one another, i.e. an erroneous coupling exists.

In a further refinement, the present noise factor is formed from the ratio of the grey-scale values of spatially adjacent pixels.

In this case, the search for erroneous couplings is concentrated in a defined manner on pixels in which a coupling can occur with a certain probability. Preferably, the pixels of a line, of a column and/or within a contiguous partial region (cluster) are checked. The refinement makes it possible to reduce the data processing complexity and to accelerate the carrying out of the method.

In a further refinement, the present noise factor and the reference noise factor are compared with one another with regard to individual pixels.

In this refinement, the image sensor is checked with pixel accuracy, which makes it possible to detect extremely small errors. This ensures a particularly high functional reliability of the image sensor.

In another refinement, the present noise factor and the reference noise factor are compared with one another with regard to groups of pixels.

This enables the processing complexity to be reduced and the method to be carried out in an accelerated manner. In contrast to the previously mentioned alternative, however, the image sensor is in this case no longer checked individually for each pixel, but rather only region by region.

In a further refinement, an average grey-scale value of the at least one light-sensitive pixel is furthermore determined and the comparison step is carried out in a manner dependent on the average grey-scale value.

This reduces the processing complexity since the carrying out of the method is concentrated on those pixels in which a reliable statement on the basis of the photon noise is possible.

It goes without saying that the features mentioned above and the features yet to be explained below can be used not only in the combination respectively specified but also in other combinations or by themselves without departing from the scope of the present invention.

BRIEF DESCRIPTION OF THE DRAWINGS

Exemplary embodiments of the invention are illustrated in the drawing and are explained in more detail in the description below. In the figures.

DETAILED DESCRIPTION OF PREFERRED EMBODIMENTS

Figure 1:
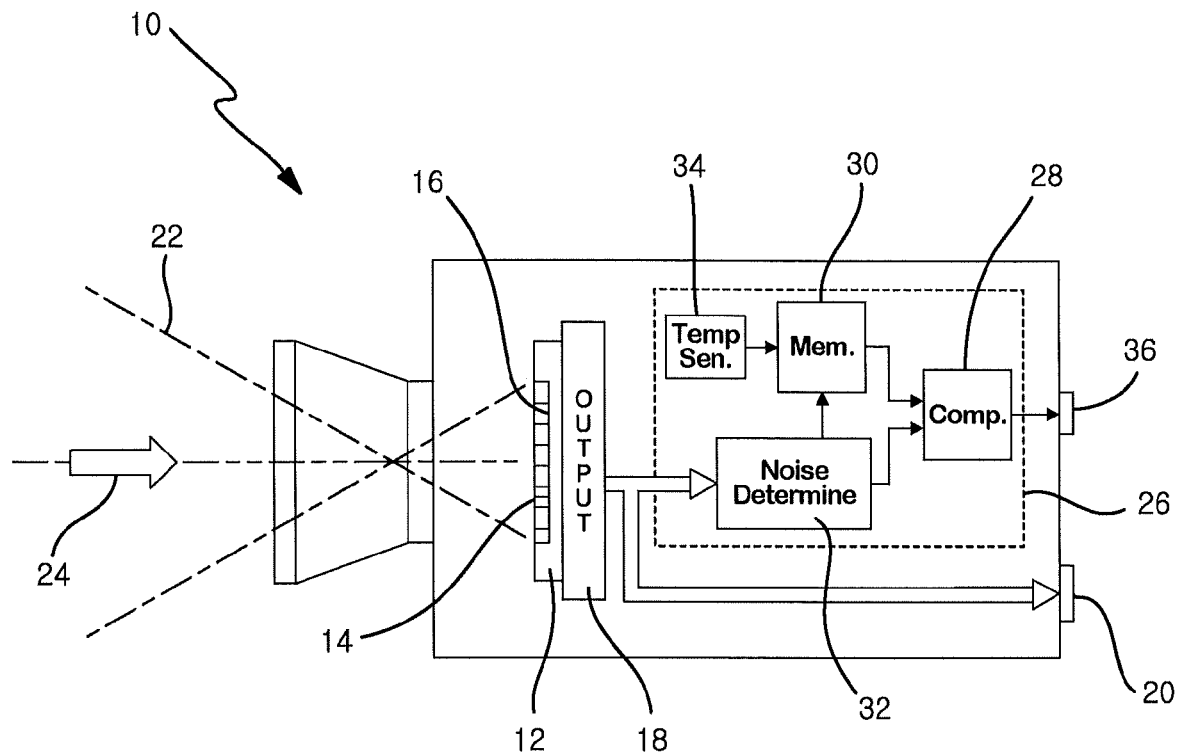
FIG. 1 shows a schematic illustration of an apparatus according to the invention in the form of an electronic camera.

In FIG. 1, an apparatus according to the invention in the form of an electronic camera is designated in its entirety by reference numeral 10.

The camera 10 has an image sensor 12 having a plurality of pixels 14, 16. The pixels 14, 16 are arranged in a matrix-like fashion, in the case of small image sensors sometimes also in linear fashion, with respect to one another and together form the light-sensitive area of the image sensor 12.

The reference numeral 18 designates an output unit, which provides grey-scale values of the light recorded by the pixels 14, 16 for read-out. In this case, the term "grey-scale values" has become established for the designation of these values. However, it does not preclude the image sensor from also supplying color information coded in these values.

In this case, the grey-scale values are forwarded as digital numerical values via a terminal 20 to a downstream image processing unit. As an alternative, the downstream image processing unit may also be integrated into the housing of the camera 10, which is preferred in particular if the camera 10 is used in a protective apparatus for safeguarding a hazardous area.

The image sensor 12 is preferably a CMOS image sensor with a linear characteristic curve. However, the invention is not restricted thereto and can equally be applied to other image sensors.

The reference numeral 22 designates a schematically indicated beam path on which light 24 impinges on the image sensor 12.

The reference numeral 26 designates a monitoring unit for checking the functional reliability of the camera 10 and in particular the image sensor 12. In a preferred exemplary embodiment, the monitoring unit 26 is realized by means of a microprocessor on which the method according to the invention is carried out in the form of program steps. In this exemplary embodiment, the monitoring unit 26 has a memory (not illustrated here) in which the individual program steps are stored in a manner known per se.

In the structural breakdown illustrated here, the monitoring unit 26 comprises a comparator 28. The comparator 28 is first of all connected to a memory 30, in which dark noise factors of the individual pixels 14, 16 are stored as reference values. The dark noise factors of the pixels 14, 16 are determined during the calibration of the camera 10 and are stored in the memory 30.

Furthermore, the comparator 28 is connected to a noise determining part 32, in which a present noise factor of the grey-scale values can be determined for each pixel 14, 16. The comparator 28 compares a presently determined noise factor with a corresponding dark noise factor in the manner that will be explained in more detail below.

The reference numeral 34 designates a temperature sensor, the output signal of which is fed to the memory 30. This makes it possible to select the dark noise factor used for the comparison in a manner dependent on the respective ambient temperature.

In the present exemplary embodiment, the memory 30 is directly connected to the noise determining part 32. This enables the dark noise factors to be determined very simply in the same way as the present noise factors used during the operation of the camera 10.

The result of the comparison of the two noise factors mentioned is provided at the output of the comparator 28. In the present exemplary embodiment, the comparator 28 generates an error signal which is passed towards the outside via a terminal 36.

Figure 2:
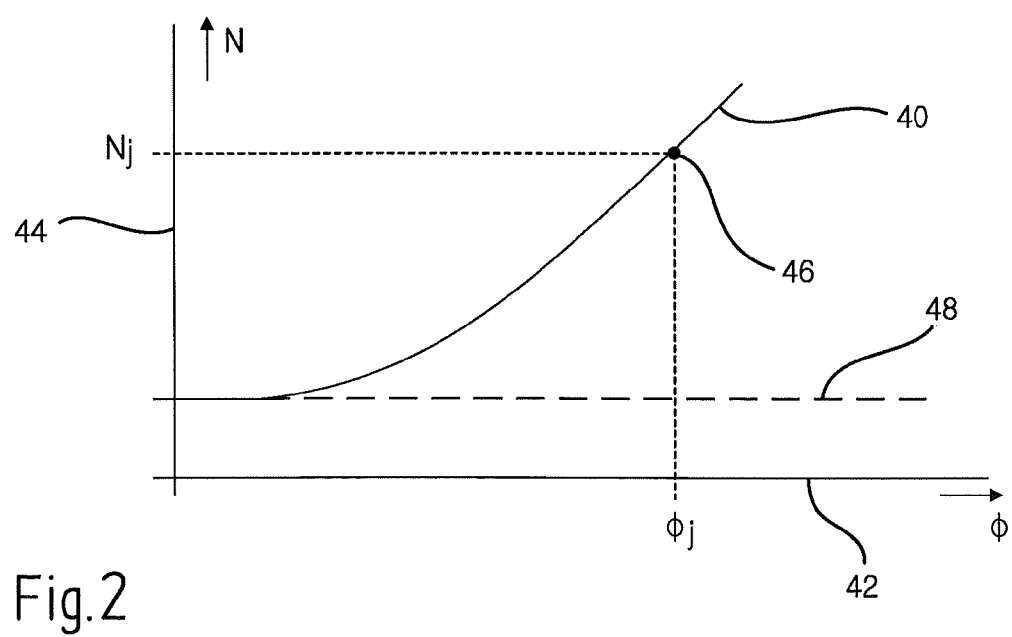
FIG. 2 shows a schematic illustration of the dependence of the noise behavior of an individual pixel on the incident light intensity.

In FIG. 2, reference numeral 40 designates a characteristic curve illustrating the noise behavior of an individual pixel 14, 16 in a manner dependent on the light intensity. Accordingly, the intensity $\Phi$ of the incident light 24 is plotted on the abscissa 42 and the noise level N is plotted on the ordinate 44. By way of example, a point 46 on the characteristic curve 40 has the coordinates ($\Phi_j$, $N_j$).

The reference numeral 48 represents that noise component which is independent of the intensity of the incident light. This noise component is primarily attributable to the dark noise. By contrast, the rise in the characteristic curve 40 as the light intensity $\Phi$ increases shows the photon noise.

Figure 3:
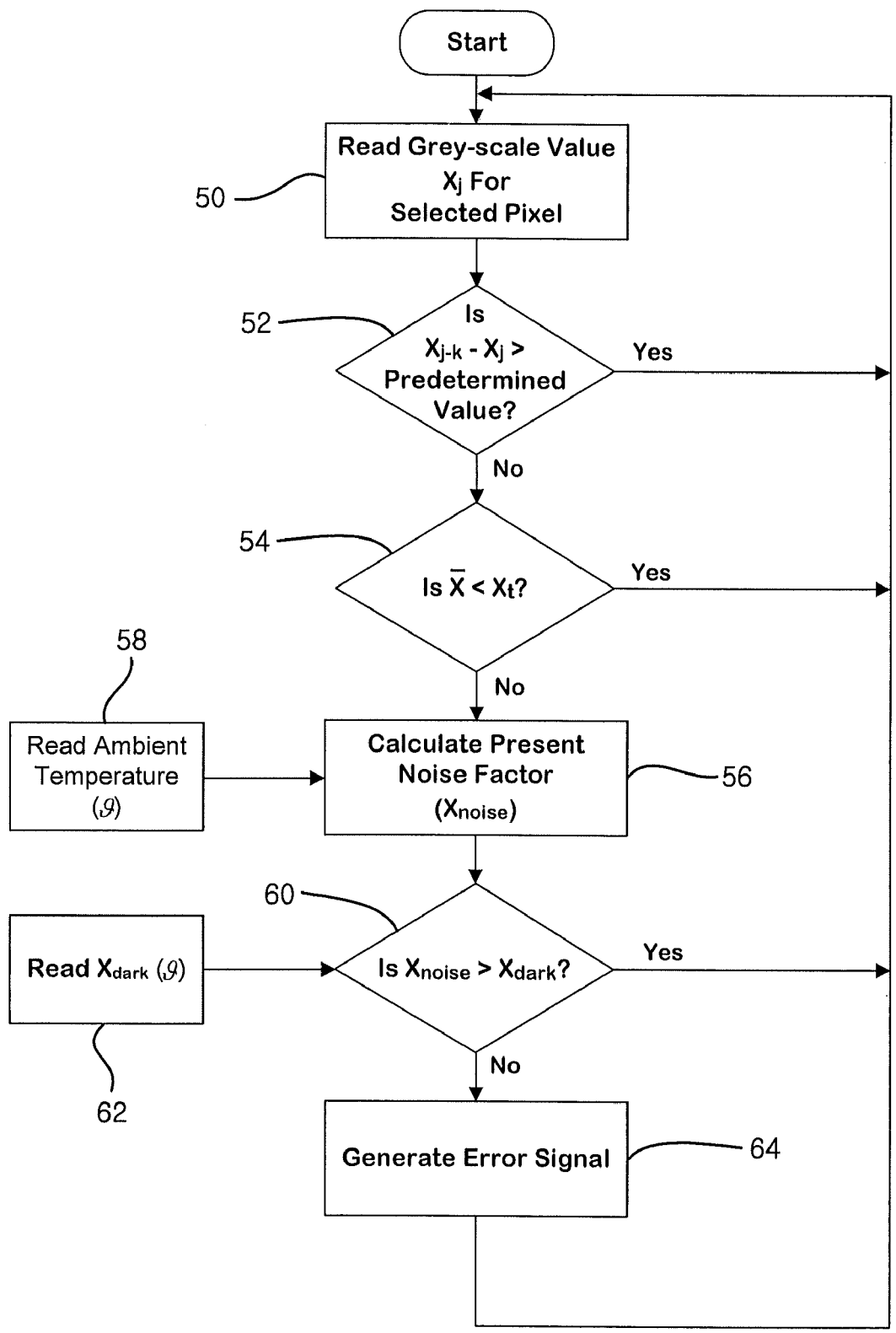
FIG. 3 shows a flow diagram for illustrating a first exemplary embodiment of the method according to the invention.

FIG. 3 illustrates a flow diagram for a method which can be used to detect so-called "stuck at" errors in individual pixels 14, 16. The method begins in step 50 with the reading-in of a grey-scale value $x_j$ for the pixel to be checked. This is followed by checking in step 52 to determine whether the read-in grey-scale value $x_j$ reveals a signal dynamic range. A signal dynamic range is present in particular when the grey-scale value $x_j$ differs from the preceding grey-scale value or values $x_{j-k}$ by more than a predetermined difference. This may occur for example on account of movements in the monitored spatial area. If a signal dynamic range is identified, a "stuck at" error can be ruled out from the beginning, for which reason the method returns to step 50.

If a signal dynamic range is not identified, which is the case primarily under static conditions in the monitored spatial area, a check is made in step 54 to determine whether the average grey-scale value $\bar{x}$ of the pixel has a sufficient background brightness ($\bar{x} > x_t$). If the average grey-scale value $\bar{x}$ of the checked pixel lies below a defined background brightness $x_t$, the proportion of photon noise in the total noise level is too low to obtain a reliable statement about the functionality of the pixel by means of this method. Accordingly, the method returns to step 50 in this case. In the case of multiple repetition of this result, an error signal may also be generated (not illustrated).

If the background brightness $\bar{x}$ of the grey-scale values of the checked pixel lies above the threshold $x_t$ mentioned, a present noise factor is determined in step 56. In this case, in accordance with step 58, the ambient temperature $\vartheta$ is also taken into account in this exemplary embodiment.

Preferably, the present noise factor is in this case determined as a variance or as a standard deviation (root of the variance) by means of a statistical evaluation in accordance with the formula below:

$$x_{noise} = \frac{1}{n}\sum_{j=1}^{n}(x_j(\vartheta) - \bar{x}(\vartheta))^2$$

In this case:
$x_j$ designates the present grey-scale value,
$\bar{x}$ designates the mean value of all the grey-scale values taken into account,
n designates the number of measurements, and
$\vartheta$ designates the temperature.

As an alternative, the present noise factor may also be determined as an average deviation of the present grey-scale value from the preceding grey-scale values. In this case, the noise factor is determined according to the following formula:

$$x_{noise} = \frac{1}{n-1}\sum_{j=2}^{n}|x_j(\vartheta) - x_{j-1}(\vartheta)|$$

Finally, the difference between the maximum and minimum grey-scale value of the checked pixel within a measurement cycle may also be used as the present noise factor. This is a very simple determination of a noise factor. The two alternatives mentioned previously are preferred, however, since they enable the pixel to be checked more reliably.

In step 60, the presently determined noise factor is then compared with a dark noise factor $x_{dark}(\vartheta)$ determined in the same way which, in accordance with step 62, is read from the memory 30 of the camera 10. If the presently determined noise factor $x_{noise}$ is greater than the dark noise factor $x_{dark}$ used for the comparison, the function of the checked pixel is in order. The method accordingly returns to step 50, and a new checking cycle begins.

If the dark noise factor $x_{dark}$ is greater than the presently determined noise factor $x_{noise}$, a "stuck at" error is present and an error handling routine follows in step 64. Within the error handling routine 64, an error signal may for example be output via terminal 36. The method subsequently returns to step 50 in order to begin a new checking cycle for other pixels.

In a departure from the method illustrated, it is also possible to check a plurality of pixels simultaneously.

Figure 4:
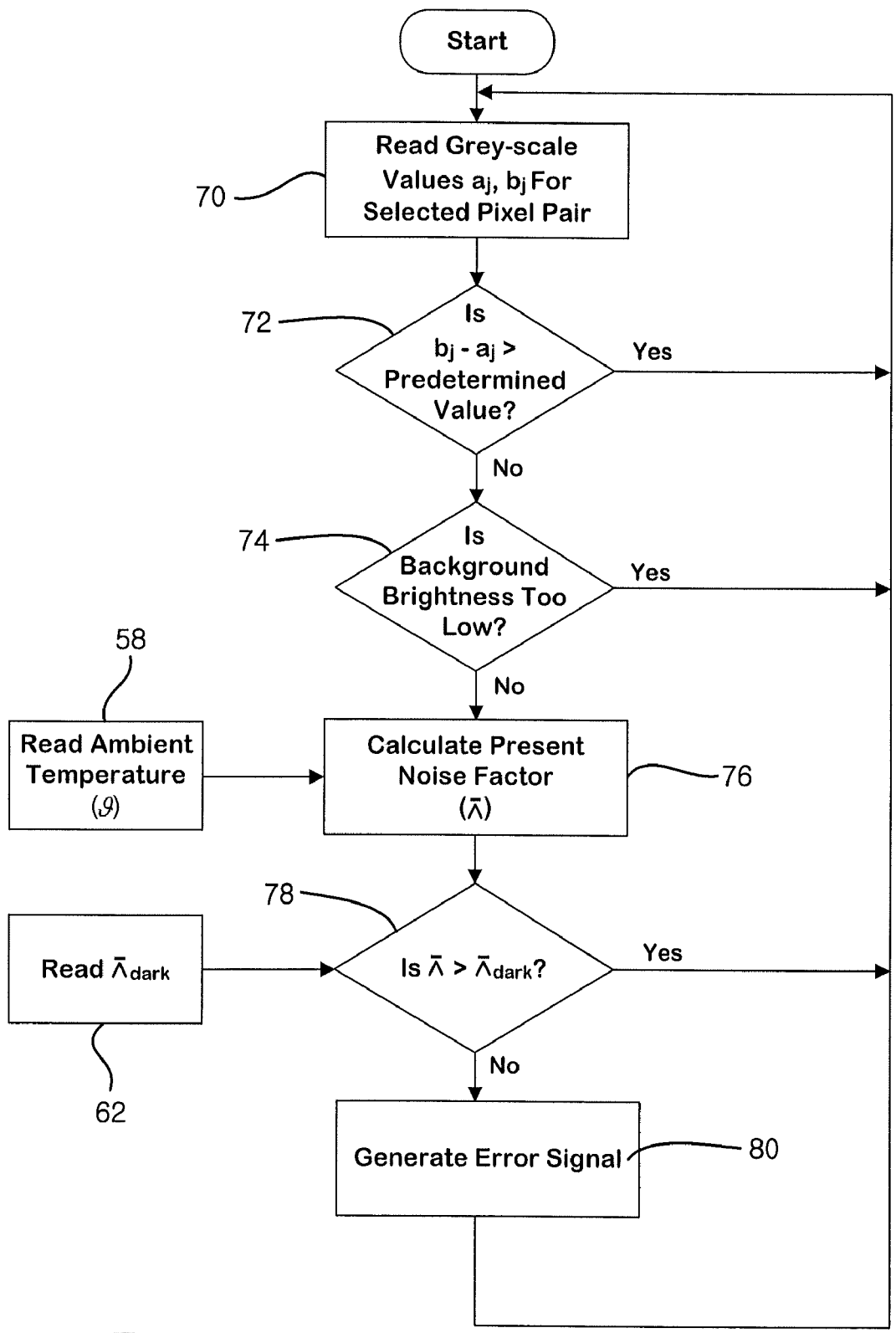
FIG. 4 shows a flow diagram for illustrating a second exemplary embodiment of the method according to the invention.

FIG. 4 illustrates an exemplary embodiment of a method which can be used to ascertain couplings between two different pixels. In this case, identical reference symbols identify the same elements as before.

In step 70, firstly the grey-scale values $a_j$, $b_j$ of the two pixels to be compared with one another are read out. In step 72, the two grey-scale values are then compared. If the two grey-scale values differ significantly, which may be caused for example by a bright-dark structure in the recorded image, it is assumed in this case that no coupling is present. The method accordingly returns to step 70.

If no structure is discovered in step 72, the background brightness for the two pixels is once again checked in step 74. If the background brightness is too low, the method returns to step 70 since a reliable statement is not ensured in that case. If this result is repeated a number of times, an error signal is generated (not illustrated).

If a sufficient background brightness is ascertained in step 74, a present noise factor is determined by the ratio of the grey-scale values of the two pixels in step 76, to be precise according to the following formula:

$$\overline{\Lambda} = \frac{1}{n}\sum_{j=1}^{n}|a_j - b_j|$$

In this formula:
$\overline{\Lambda}$ designates the noise factor,
a designates the grey-scale value of the first pixel,
b designates the grey-scale value of the second pixel, and
n designates the number of measurement cycles.

In accordance with step 58, the temperature is once again taken into account in this case. A check is then made in step 78 to determine whether the noise factor $\overline{\Lambda}$ thus determined is greater than the dark noise factor $\overline{\Lambda}_{dark}$ stored for the corresponding temperature in the memory 30. If the dark noise factor $\overline{\Lambda}_{dark}$ is smaller, it is assumed that no coupling is present between the two pixels. If the mean deviation $\overline{\Lambda}$ of the two pixels is less than or equal to the dark noise factor $\overline{\Lambda}_{dark}$, however, a coupling of the two pixels must be assumed. Accordingly, an error routine is initiated in step 80.

Figure 5:
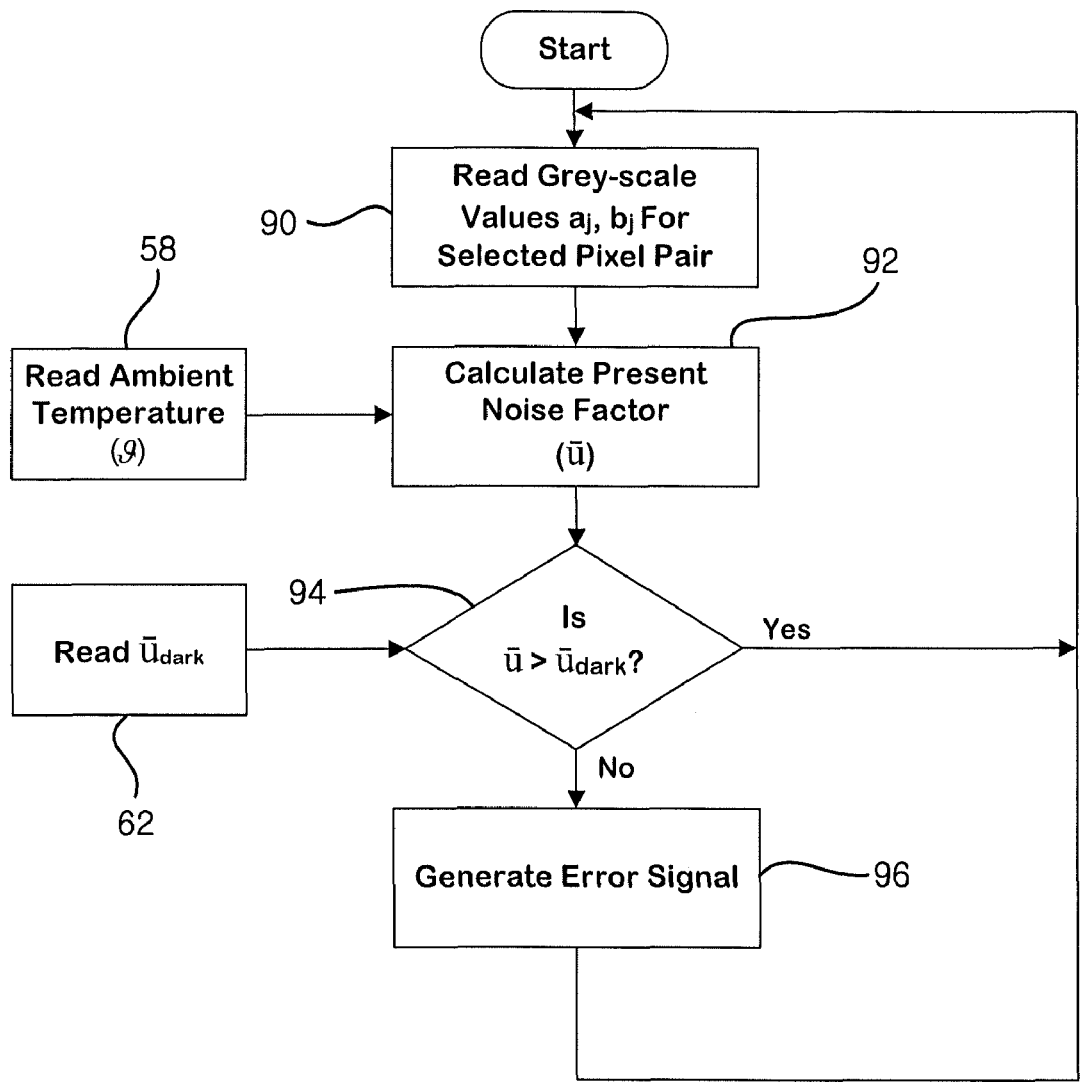
FIG. 5 shows a flow diagram for illustrating a third exemplary embodiment of the method according to the invention.

FIG. 5 illustrates a further exemplary embodiment of a method for exposing couplings. This exemplary embodiment is preferred from a present-day point of view since, in contrast to the method in accordance with FIG. 4, no corruption occurs if the grey-scale values of the pixels compared with one another differ significantly from one another on account of a structure. In step 90, firstly the grey-scale values $a_j$ and $b_j$ of the two pixels are once again read out. In step 92, a present noise factor is subsequently determined according to the following formula:

$$\overline{U} = \left(\frac{1}{n-1}\sum_{j=2}^{n}\left|\frac{a_j - 1}{b_j - 1} - \frac{a_j}{b_j}\right|\right) \times \sum_{j=1}^{n}b_j \bigg/ \sum_{j=1}^{n}a_j$$

In this formula:
$\overline{U}$ designates the present noise factor,
a designates the grey-scale values of the first pixel,
b designates the grey-scale values of the second pixel,
n designates the number of measurement cycles.

In step 94, the noise factor $\overline{U}$ is compared with a dark noise factor $\overline{U}_{dark}$, which has been determined according to the same formula as above, but in darkness. If the present noise factor $\overline{U}$ is greater than the stored dark noise factor there is no coupling present between the two pixels. Otherwise an error routine once again follows in accordance with step 96.

The advantage of the method according to FIG. 5 is that the couplings of the respective grey-scale values between two pixels can be influenced by an additive or multiplicative constant, since all that is checked here is whether the statistical temporal fluctuation of the grey-scale values is independent of one another.

There are commercially available image sensors in which the pixels located at the outer edge are arranged such that no light can fall on them because of the construction. These edge pixels thus intrinsically always supply signals which correspond to a dark value. In a preferred exemplary embodiment, such an image sensor is used in the camera according to the invention, and the dark noise factor used as a reference is determined from the grey-scale values of the darkened pixels at the edge. As an alternative, the pixels at the edge of an image sensor may also be darkened by suitable arrangement in the camera in order thus to be able to determine the required reference values in a simple manner.

In a further exemplary embodiment, the following formula is used for determining the noise factor:

$$x_{noise} = \frac{1}{n}\sum_{j=1}^{n}|y_j - x_j|$$

In this case:
$x_j$ designates the grey-scale value of the pixel j from the present image,
$y_j$ designates the grey-scale value of the pixel j from the preceding image,
n designates the number of pixels.

In this exemplary embodiment, the difference in magnitude between the grey-scale values from two successive images is determined for each pixel. An average difference in magnitude over all the pixels is subsequently formed. As an alternative, the standard deviation or the variance could also be used. A dark noise factor determined in the same way from two successive dark images is used as the reference noise factor. In this case, then, the two noise factors are determined from a plurality of pixels of a differential image. In the case of an error-free image sensor, the present noise factor must exceed the dark noise factor provided that a certain background brightness is present. If the present noise factor is less than the dark noise factor, the image sensor evidently supplies a "frozen image", i.e. it no longer reacts to variations in the light that is presently incident.

Movements and motif changes in the successive images increase the present noise factor relative to the dark noise factor, which, however, then likewise indicates a functioning image sensor.

In this exemplary embodiment, although it is not possible to make a statement about the individual functionality of the individual pixels, this exemplary embodiment instead yields a very simple and fast qualitative statement about the functionality of the image sensor.

What is claimed is:

1. A method for checking functional reliability of an image sensor operationally arranged to monitor a designated area, said image sensor having a plurality of light-sensitive pixels, with at least one pixel producing grey-scale values depending on an intensity of light impinging on said at least one pixel, the method comprising the steps of:
   recording grey-scale values from said at least one pixel while light is impinging on said at least one pixel,
   determining an actual noise factor from the recorded grey-scale values of said at least one pixel in a manner such that the actual noise factor varies as a function of the intensity of light impinging on said at least one pixel,
   providing a dark noise factor defining a noise behavior of the grey-scale values of said at least one pixel without light impinging, and
   evaluating the actual noise factor and the dark noise factor, wherein a failure of the at least one pixel is detected and an error signal generated if the actual noise factor does not exceed the dark noise factor.

2. The method of claim 1, wherein the actual noise factor is determined by a statistical evaluation of a plurality of read-out grey-scale values.

3. The method of claim 1, wherein the actual noise factor and the dark noise factor each are determined in an equivalent manner.

4. The method of claim 1, wherein an ambient temperature for the image sensor is determined, and wherein the actual noise factor and the dark noise factor are evaluated as a function of the ambient temperature.

5. A method for detecting failures of an image sensor operationally arranged to monitor a designated area, said image sensor having a plurality of light-sensitive pixels, each of said pixels producing grey-scale values depending on an intensity of light impinging on said pixels, the method comprising the steps of:
   determining a present noise factor from the grey-scale values of at least one of said pixels in a manner such that the present noise factor varies as a function of the intensity of light impinging on said at least one pixel during the operational monitoring of the designated area,
   providing a dark noise factor as a reference noise factor for said at least one pixel, and
   comparing the present noise factor and the reference noise factor,
   wherein a failure of the at least one pixel is detected and an error signal generated if the present noise factor does not exceed the reference noise factor although light is impinging on said at least one pixel.

6. The method of claim 5, wherein the present noise factor is determined by a statistical evaluation of a plurality of grey-scale values of said at least one pixel.

7. The method of claim 5, wherein the present noise factor and the reference noise factor are determined in an equivalent manner.

8. The method of claim 5, wherein the present noise factor and the reference noise factor are compared with one another in a manner dependent on an ambient temperature.

9. The method of claim 5, wherein the present noise factor for the at least one pixel is determined as an absolute value.

10. The method of claim 5, wherein the present noise factor and the reference noise factor are compared to one another with regard to one and the same pixel.

11. The method of claim 5, wherein the present noise factor is determined from a ratio of the grey-scale values of at least two different pixels.

12. The method of claim 5, wherein the present noise factor is determined from a ratio of the grey-scale values of spatially adjacent pixels.

13. The method of claim 5, wherein the present noise factor and the reference noise factor are compared to one another with regard to individual pixels.

14. The method of claim 5, wherein the present noise factor and the reference noise factor are compared to one another with regard to groups of pixels.

15. A method for checking functional reliability of an image sensor operationally arranged to monitor a designated area, said image sensor having a plurality of light-sensitive pixels, with each light-sensitive pixel producing grey-scale values for read out as a function of light impinging on said pixel, the method comprising the steps of:

determining an actual noise factor from the grey-scale values of at least one pixel, the grey-scale values being recorded while light is impinging on said pixel during the operational monitoring of the designated area, providing a reference noise factor for the at least one pixel defining a noise behavior of said pixel without light impinging thereon, and evaluating the actual noise factor, wherein the actual noise factor and the reference noise factor each define statistical fluctuations of the grey-scale values of the at least one pixel, and wherein a functional error of the at least one pixel is detected and an error signal generated if the present noise factor misses a predetermined criterion defined by the reference noise factor.

16. The method of claim 15, wherein the actual noise factor is determined from a statistical evaluation of a plurality of grey-scale values of said at least one pixel.

17. The method of claim 15, wherein the actual noise factor and the reference noise factor are determined in the same manner.

18. The method of claim 15, wherein the actual noise factor and the reference noise factor are evaluated as a function of an ambient temperature.

19. The method of claim 15, wherein the actual noise factor and the reference noise factor are derived for each individual pixel.

20. The method of claim 15, wherein the actual noise factor and the reference noise factor are evaluated with regard to groups of pixels.

21. An electronic camera operationally arranged to monitor a designated area, including an image sensor having a plurality of light-sensitive pixels for generating grey-scale values as a function of an intensity of light impinging on the pixels, an output unit which provides grey-scale values from the light-sensitive pixels for read-out, and a monitoring unit for checking a functional reliability of the image sensor during the operational monitoring of the designated area, the monitoring unit comprising at least one memory, in which at least one dark noise factor for at least one pixel is stored as a reference noise factor, and the monitoring unit having a noise determining part and a comparator, wherein the noise determining part is adapted to determine a present noise factor from the grey-scale values of at least one pixel during the operational monitoring of the designated area such that the present noise factor varies in a manner dependent on the intensity of impinging light, wherein the comparator is adapted to compare the present noise factor and the dark noise factor, and wherein a failure of the at least one pixel is detected and an error signal generated if the present noise factor does not exceed the dark noise factor despite light impinging on the pixel.

22. The electronic camera of claim 21, wherein the noise determining part is adapted to determine the present noise factor by a statistical evaluation of a plurality of grey-scale values of said at least one pixel.

23. The electronic camera of claim 21, wherein the present noise factor and the reference noise factor are determined in an equivalent manner.

24. The electronic camera of claim 21, further comprising a detector for determining an ambient temperature, said comparator being adapted to compare the present noise factor and reference noise factor as a function of the ambient temperature.

25. The electronic camera of claim 21, wherein the comparator is adapted to compare the present noise factor and the reference noise factor to one another with regard to one and the same pixels.

26. The electronic camera of claim 21, wherein the comparator is adapted to compare the present noise factor and the reference noise factor to one another with regard to individual pixels.

27. The electronic camera of claim 21, wherein the comparator is adapted to compare the present noise factor and the reference noise factor to one another with regard to groups of pixels.

28. An electronic camera operationally arranged to monitor a designated area, including an image sensor having a plurality of light-sensitive pixels, an output unit which provides grey-scale values of the light-sensitive pixels for read-out, and a monitoring unit for checking the functional reliability of the image sensor, the monitoring unit comprising at least one memory for storing reference values, wherein at least one reference noise factor for at least one pixel defining a noise behavior of said pixel without light impinging thereon, is stored in the memory and wherein the monitoring unit has a noise determining part and a comparator, the noise determining part being capable of determining a present noise factor of the grey-scale values of the at least one pixel recorded while light is impinging on the at least one pixel, and the comparator being capable of comparing the present noise factor and the reference noise factor, wherein a functional error is detected and an error signal generated if the present noise factor does not exceed the reference noise factor.

29. A non-transitory computer readable medium for an electronic camera operationally arranged to monitor a designated area, the electronic camera including a microprocessor and an image sensor, said image sensor comprising a plurality of light-sensitive pixels for producing grey-scale values depending on an intensity of light impinging on said pixels, the computer readable medium containing a program comprising a plurality of program code instructions for executing on the microprocessor, the program code instructions being configured to cause the following:

recording grey-scale values from at least one pixel while light is impinging on said at least one pixel during the operational monitoring of the designated area, determining an actual noise factor from the grey-scale values of said at least one pixel in a manner such that the actual noise factor varies as a function of the intensity of light impinging on said at least one pixel, providing a dark noise factor defining a noise behavior of the grey-scale values of said at leas one pixel without light impinging, and evaluating the actual noise factor and the dark noise factor, wherein a failure of the at least one pixel is detected and an error signal generated if the actual noise factor does not exceed the dark noise factor.

30. The method of claim 1, wherein the step of recording grey-scale values from said pixel is performed while light is impinging on said pixel during the operational monitoring of the designated area.

31. The electronic camera of claim 28, wherein the noise determining part of the monitoring unit determines the present noise factor of the grey-scale values of the at least one pixel during the operational monitoring of the designated area.

* * * * *

UNITED STATES PATENT AND TRADEMARK OFFICE
CERTIFICATE OF CORRECTION

| | | |
|---|---|---|
| PATENT NO. | : 7,872,678 B2 | Page 1 of 1 |
| APPLICATION NO. | : 10/909714 | |
| DATED | : January 18, 2011 | |
| INVENTOR(S) | : Oliver Fuchs et al. | |

It is certified that error appears in the above-identified patent and that said Letters Patent is hereby corrected as shown below:

Column 11,

Lines 15-17, "present noise factor misses a predetermined criterion defined by the reference noise factor." should be -- actual noise factor does not exceed the reference noise factor. --.

Column 12, line 50

"leas" should be -- least --.

Signed and Sealed this
Twenty-eighth Day of June, 2011

David J. Kappos
*Director of the United States Patent and Trademark Office*